United States Patent [19]
Hatzenbuhler

[11] 3,807,862
[45] Apr. 30, 1974

[54] RAMAN SPECTROSCOPY IN THE PRESENCE OF FLUORESCENCE

[75] Inventor: Douglas Albert Hatzenbuhler, Lawrenceville, N.J.

[73] Assignee: Sybron Corporation, Rochester, N.Y.

[22] Filed: Dec. 18, 1972

[21] Appl. No.: 316,347

[52] U.S. Cl............................. 356/75, 356/114
[51] Int. Cl............................................. G01j 3/44
[58] Field of Search..................... 356/75, 114, 117

[56] References Cited
UNITED STATES PATENTS

| | | |
|---|---|---|
| 3,697,180 | 10/1972 | Mori et al............................ 356/75 |
| 2,351,539 | 6/1944 | Peck.................................... 356/117 |
| 3,584,959 | 6/1971 | DelCarlo et al..................... 356/117 |
| 3,527,538 | 9/1970 | Allen et al.......................... 356/117 |

Primary Examiner—Ronald L. Wibert
Assistant Examiner—V. P. McGraw
Attorney, Agent, or Firm—Theodore B. Roessel; Joseph C. MacKenzie

[57] ABSTRACT

A fluid sample Raman-scatters a plane-polarized laser beam. Sample radiation intensity perpendicular to the laser beam, and perpendicular to its plane of polarization, is compared to sample radiation intensity perpendicular to the laser beam, but in its plane of polarization, in order to provide a measure of Raman-scattering independent of sample fluorescence.

13 Claims, 2 Drawing Figures

RAMAN SPECTROSCOPY IN THE PRESENCE OF FLUORESCENCE

BACKGROUND OF THE INVENTION

This invention relates to Raman spectroscopy, in general, and to laser Raman spectroscopy (LRS), in particular. In LRS, a beam of monochromatic light (light of a single frequency) irradiates a sample, and a small part of the light is inelastically scattered by the sample at frequencies modulated by the fundamental frequencies of vibration and rotation (and any low-lying electronic states) of the sample molecules. This scattered light has a different frequency from that of the beam irradiating the sample, and the difference in frequency is directly related to molecular motion.

Therefore, LRS has molecular specificity analogous to infrared spectroscopy (IRS). However, LRS is governed by a different set of selection rules (making different vibrational motions and "group frequencies" observable in LRS than in IRS), and, LRS operates entirely in the more convenient visible region of the spectrum. Further, aqueous solutions are much more easily studied by LRS than by IRS due to the intense absorption of infrared by $H_2O$ bands and the solubility of almost all infrared window materials in water.

Heretofore, IRS has been used more extensively than LRS in practically all applications of vibrational spectroscopy, because Raman instrumentation, although available, was of limited use because of the weakness of all available light sources. With the more recent development of intense laser sources and high-quality photomultiplier tubes, Raman instrumentation, in terms of quality and availability, basically, reached par with IRS instrumentation, but, nevertheless, the usefulness of LRS, as practiced in the prior art, was restricted because many materials are not suitable for LRS analysis using prior art techniques or apparatus. Thus, any materials, analysis of which would be useful or interesting for research or industrial purposes, fluoresce in such fashion when strongly illuminated, that useful Raman spectra cannot be obtained by conventional LRS.

One object of my invention is to provide methods and apparatus for LRS of materials which fluoresce when illuminated by a laser source for LRS purposes. In particular, it is an object of my invention to provide such methods and apparatus for use with materials which fluoresce because of some impurity therein, without it being necessary to remove such impurity before subjecting the materials to LRS.

Another object of my invention is to provide methods and apparatus for use in LRS of materials of either industrial or research interest or utility, even though subjecting such materials to LRS causes them to fluoresce.

Finally, it is the general object of my invention to provide new and improved LRS and applications thereof, as will be evident from the description to follow herein.

SUMMARY OF THE INVENTION

The above stated objects are achieved by irradiating a sample of freely-reorienting material with a plane-polarized beam of monochromatic light capable of being Raman-scattered by whatever is (or might be) of interest in the sample, by examining the radiation consequently emitted by the sample parallel to and also perpendicular to the electric vector of the light irradiating the sample, and by eliminating the effect of such of the emitted radiation as is common to the parallel and perpendicular orientations. The radiation the sample emits may be examined by a pair of separate optical systems located to detect, separately and simultaneously, radiation having the parallel and perpendicular orientations. However, further according to the invention, a single optical system located to detect emitted radiation from one said orientation will suffice, if periodically the plane of polarization of the radiation incident on the sample, is deflected in a sense and amount such as to bring the emitted radiation, corresponding to the other said orientation, into the single optical system.

BRIEF DESCRIPTION OF THE DRAWING

FIG. 1 shows the physical elements of the invention with reference to orthogonal coordinate axes X, Y, and Z. Thus, a sample S located at the origin O of the said axes, is irradiated by the light beam from a laser 2. The laser beam may be supposed to coincide with the Y axis, hence the laser would be located at −Y. The beam is plane polarized so that at the origin O its electric vector coincides with the Z axis, and so is appropriately denoted $E_Z$.

Figure 1:
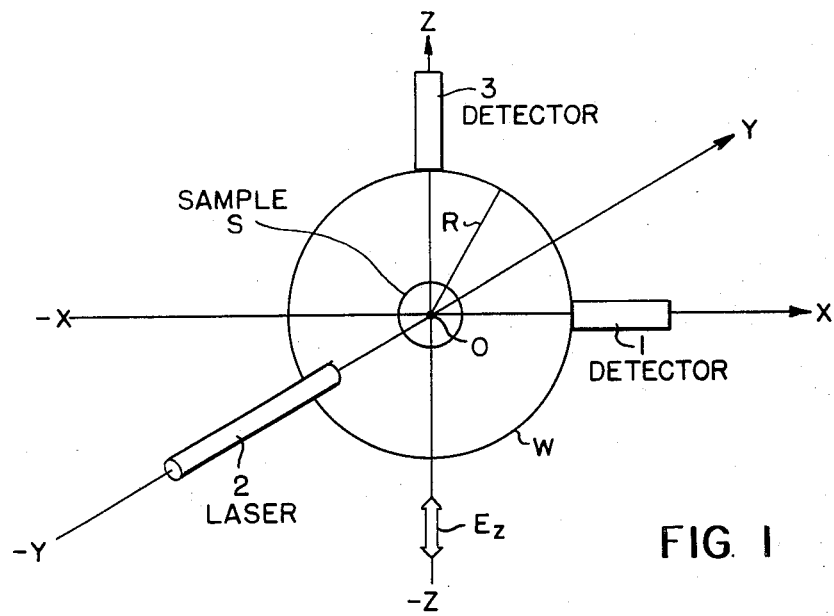
FIG. 1 is a schematic diagram for explaining the principles of my invention.

Light detectors 1 and 3, located at X and Z, respectively, pick up radiation emitted from the sample S along the X and Z axes, respectively, and provide measures of the intensity of such radiation. Thus, the measure provided by detector 1 is proportional to $$(\bar{\alpha}^2 + 7/45\gamma^2)I_Y + I_Z \quad (1)$$

and the measure provided by detector 3 is proportional to $$(6/45\gamma^2) I_Y + I_X \quad (2)$$

where $\bar{\alpha}$ and $\gamma$ are as defined by L. A. Woodward in *Raman Spectroscopy Theory and Practice* (H. A. Szymanski, Ed.), Plenum Press, New York, 1967, page 10 et seq. $I_X$ and $I_Z$ represent intensities along X and Z of additional radiation coming from sample S, due to any cause whatsoever, and $I_Y$ is the intensity of the laser beam before it strikes the sample S.

The basic problem of LRS which we are addressing is to distinguish the Raman-scattered component of the apparent emission by the sample, from other components corresponding to $I_X$ and/or $I_Z$. The prior art proposes to suppress the other components, more or less successfully, except where the sample consists of or includes a substance or substances which the laser beam causes to fluoresce. According to my invention, however, $I_X$ and $I_Z$ are made to cancel each other out, under certain conditions.

The aforesaid conditions are, as follows:

I. The molecules of the sample material are freely reorienting, a characteristic of fluids in general.

II. The sample is free from bubbles, particles, or other optical inhomogeneities, to the extent necessary for any LRS analysis.
III. The laser beam is plane polarized.
IV. The laser is the only source of light incident on the sample, or at least there is no other source of light that cannot be eliminated by known means (filters, monochromators, etc.)
V. The sample is essentially transparent to both the laser beam and the Raman scattered components.

The foregoing conditions are not in themselves unique. If the sample is a liquid, condition I is obviously met, and condition II must be the case, if measurements are to mean anything relating to molecular structures. As for conditions III and IV each finds use in one or another or several of the numerous variety of known spectroscopic practices.

Having established the foregoing conditions, then, according to my invention, it is only necessary to measure the intensity of the apparent light emission of sample S along the X and Z axes, and to subtract one from the other to obtain a difference proportional to $$(\bar{\alpha}^2 + 1/45\gamma^2) \tag{3}$$

Expression (3) holds usefully only for any single frequency which corresponds to the laser frequency slightly shifted by Raman scattering. The conditions enunciated previously (and the monochromaticity of the laser beam) assure that the difference between the intensity measures provided by detectors 1 and 3 corresponds accurately and repeatably to exprssion (3). As will be obvious to one skilled in the art, once a measurement corresponding to expression (3) can be made, all the potential usefulness of Raman spectroscopy and its applicability to chemical analysis becomes realizable.

The scheme shown in FIG. 1 is more or less directly translatable into instrumental terms. For instance, the detector 1 and 3 could be realized as identical optical systems, perhaps conducting the X-axis and Z-axis light alternately to a photomultiplier, there being suitable circuitry connected to the photomultiplier for determining the difference between X-axis and Z-axis light intensities. This sort of instrumentation would fall within the scope of my invention, but I prefer to implement my invention in a simpler, less difficult manner, namely, as shown in FIG. 2, which shows my invention in a form not evident from FIG. 1, or from what has been disclosed thus far herein.

Figure 2:
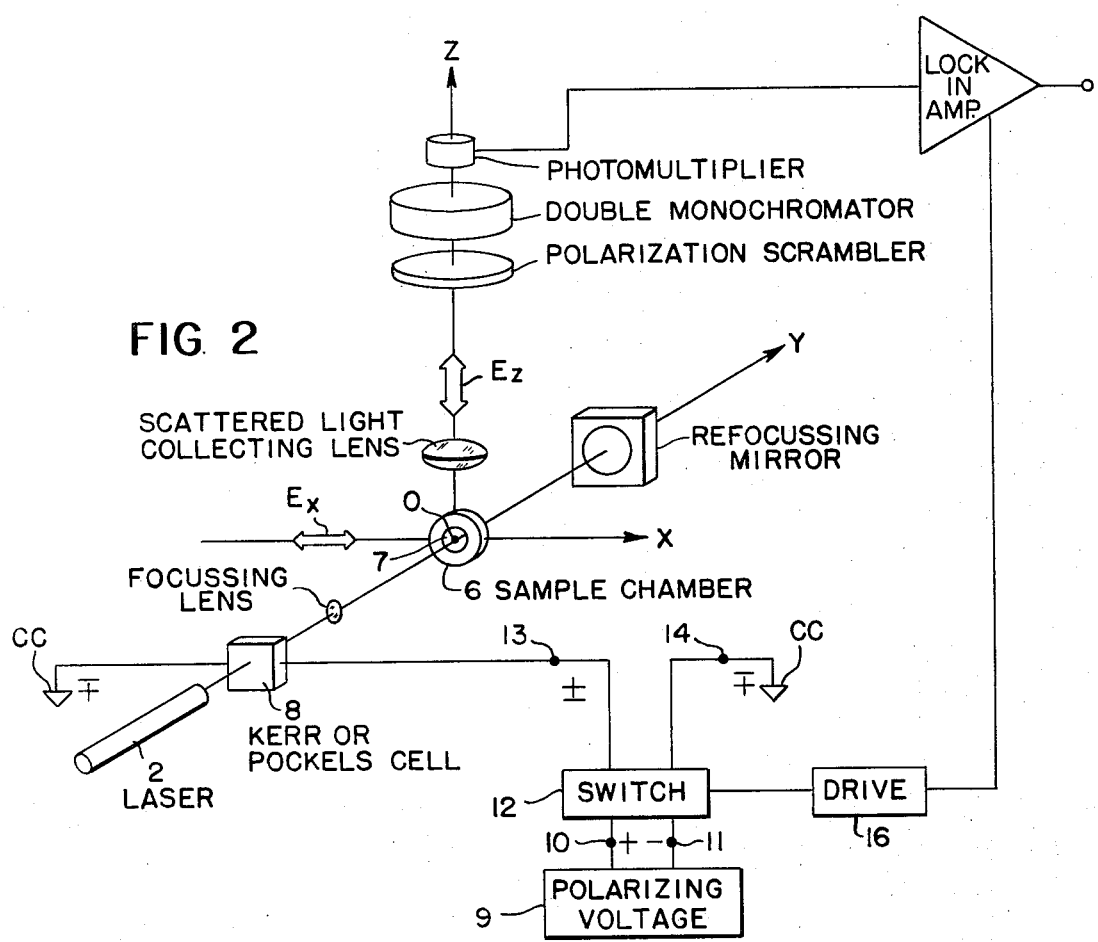
FIG. 2 shows one way of instrumenting my invention.

In FIG. 2, the elements labeled photomultiplier, double monochromator, polarization scrambler refocussing mirror, scattered light collecting lens, and focussing lens, are typical spectrometer elements needing no further description except that if it be supposed that the Raman shift in laser frequency is known, then the monochromator, and scrambler have the function of seeing to it that only light at the frequency to which the laser frequency was shifted, so to speak, gets to the photomultiplier.

Supposing the sample material to be a liquid, that liquid would be contained in a sample cell 6. As indicated in FIG. 2, cell 6 is located so as to contain the origin O, as in FIG. 1. The cell must be transparent to the laser beam at least to the extent of having a window for admitting the beam to the cell. Preferably, the cell has a similar window (not shown) on the other side thereof, whereby the refocussing mirror can reflect the laser beam back along its original path and through the cell 6 again. Likewise, such window or windows are preferably optically flat and perpendicular to the beam. It is to be understood that the cell structure details referred to herein are not critical but rather merely exemplify known expedients for obtaining and enhancing the Raman-scattering signal. The material in the cell is to be supposed to be optically isotropic. Bubbles, solid particles, and the like inclusions, if they cause optical anisotropy, should easily be removed by filtering the sample material.

According to the invention, I provide a polarizer 8 to provide, first, for condition II supra, and second, for angularly deflecting the plane of polarization of the laser beam 90° about the Y-axis, that is to say, so that placing the electric vector on the X-axis (and making it appropriate to denote it $E_X$), would now indicate the orientation of the plane of polarization of the laser beam. The end effect is of rotating the coordinate system. Thus, as shown the photomultiplier is first at Z, so taking the sample tube as coincident with X, then deflecting the plane of polarization puts Z at —X, X at Z, —Z at X, and —X at —Z, so that photomultiplier is next at X, in effect.

The polarizer 8 may be either a Kerr cell or a Pockels cell operated by a polarizing voltage from a source 9 having plus terminal 10 and negative terminal 11. A reversing switch 12 connects these terminals to terminals 13 and 14, terminal 13 being connected to the polarizer 8 and terminal 14 being connected to circuit common CC, polarizer 8 also having a connection to circuit common. The function of the switch is to alternate the polarities of terminals 13 and 14 as indicated by the several minus-plus and plus-minus signs in FIG. 2, so that operation of the switch reverses polarity of the cell polarizing voltage thereby deflecting the laser beam plane of polarization through an angle of 90°. As I indicated in connection with FIG. 2, the photomultiplier may be provided with suitable circuitry, for example, a lock-in amplifier 15, for deriving a measure of expression (3), supra, in response to the X and Z emissions alternating with each other on the photomultiplier. Because lock-in amplifiers, and other circuitry of that nature which operate with switched inputs, have a mode of operation requiring synchronism with switching their inputs, a drive 16 common both to reversing switch 12 and lock-in amplifier 15 would be provided. A suitable lock-in frequency is 100 Hz, or any other frequency which is also slow as compared to the time it takes for the cell 8 to shift the polarization plane 90°.

As is known in the art, lock-in amplifiers measure minute changes in amplitude and phase of slowly varying AC signals, usually obscured by high amplitude noise. In the present case, such an AC signal results because of switching cell 8, and high amplitude noise is provided by sample material fluorescence. Thus, the photomultiplier output signal alternately corresponds to expression (1) and expression (2), with a fixed DC bias corresponding to the fluorescence.

The rationale of the invention is that the Raman-scattering effect takes place several orders of magnitude faster than molecular rotation, which itself is several orders of magnitude faster than the fluorescence process, and that in turn is faster than 100 Hz. Thus, the time scales for these phenomenona are on the order of $10^{-14}$, $10^{-11}$ to $10^{-10}$, and $10^{-8}$ second, respectively, all of which are small in comparison to the duration of one-half cycle at 100 Hz. In other words, it is as if the sample molecules are standing still for photons scattered by the Raman process, yet are rotating at very high speed with respect to photons emitted by the fluorescence process, yet even this last occurs an enormous number of times during each one-half cycle of 100 Hz (0.005 second) in which polarizer 8 stays at one polarity before it is switched to the other polarity, (as compared to 0.005 second, the polarity change occurs substantially instantaneously).

Consequently, if one examines sample-radiation about the circumference of a circle W, the center of which is O, and the radius vector R of which is in the XZ-plane, one finds a component of radiation the intensity of which is a function of the angle which R makes with, say, the X-axis. This component is what Raman spectroscopy seeks to measure.

Under the conditions previously described in connection with FIG. 1, one may also find a component of radiation the intensity of which is substantially constant, regardless of the aforesaid angle. This component will be fluorescence, and in general so broad and so intense that prior art Raman spectroscopic techniques totally fail unless the offending fluorescing material or materials can be removed from the sample, or it is possible to choose a laser wave length that will not cause fluorescence and yet is suitable for Raman spectroscopy. It is evident, however, that with my invention sample fluorescence does not interfere with Raman spectroscopy of the sample.

I have described my invention in terms of comparing Raman scattered light emitted from the sample perpendicular and along the electric vector of the laser beam. However, in principle, such geometry is desirable but not necessary in practice, since any two sampling orientations differing by an angle sufficient to make a measurable difference in the Raman scattered signal will suffice.

It is to be observed that the principles of my invention are not restricted to using a laser as a monochromatic light source, although in the present state of the art, the laser, as a practical matter, is the only suitable source. Also, the invention is as applicable to industrial use as a so-called "on line" instrument, as it is to laboratory use, for research purposes, say. Thus, a succession of samples of fluid flowing in an industrial process could be monitored by my invention in order to obtain a succession of measurements of composition of said fluid, which measurements could be used to control the process.

While I prefer to use a Pockels or Kerr cell as polarizer 8, this is because they can be operated at extremely high switching rates, and have no moving parts to alter the geometry of the laser beam path. However, it would also be feasible to use a mechanically-operated optical polarizer.

Having described my invention in accordance with the statutes, I claim:

1. Apparatus for use in Raman spectroscopy, comprising:

first means for providing a sample of freely-reorienting material at a given location O;

second means for directing a substantially monochromatic, plane-polarized beam of Raman-scatterable radiation to said sample at said location O for causing said sample to emit radiation in response to said beam and from said location O;

third means for detecting substantially only such component of radiation as comes from said location O, is in response to said beam, and is along the direction of the electric vector of said beam and for detecting substantially only such component of radiation as comes from said location O, is in response to said beam, and is perpendicular to the direction of the said electric vector;

fourth means connected to said third means for producing a signal representative of the difference between the intensity of the first said radiation component and the intensity of the second said radiation component.

2. The apparatus of claim 1, wherein:

said third means includes an element at a location X for picking up said first said radiation component and also an element at a location Z for picking up said second said radiation component;

said second means being at a location −Y;

said locations −Y, Z and X defining with said location O, the directions of said beam, of said first said radiation component, and of said second said radiation component, respectively, said directions being orthogonal and intersecting at said location O.

3. The apparatus of claim 1, wherein, said second means includes polarizing means for varying the plane of polarization of said beam such that sometimes said first said radiation component is directed to a predetermined location, but other times said second said radiation component is instead directed to said predetermined location;

said third means having an element at said predetermined location for picking up both said radiation components.

4. The apparatus of claim 1 wherein said beam, said first said radiation component, said second said radiation component are along the respective orthogonal axes Y, Z, and X, the origin of which axes is at said location O;

said second means being a polarizer operable to polarize said beam so that said electric vector is alternately along said X axis and along said Z-axis, whereby said first said radiation component alternates with said second said radiation component along one of said axes;

said third means being located on said one of said axes for alternately detecting said first said radiation and said second said radiation components.

5. The apparatus of claim 1, wherein, said fourth means include means for producing a pair of signals respectively representative of the intensity of said first said radiation component and the intensity of said second said radiation component, said fourth means also including means responsive to said pair of signals for producing the first said signal.

6. The apparatus of claim 5, wherein:

said third means includes an element at a location X for picking up said first said radiation component and also an element at a location Z for picking up said second said radiation component;

said second means being at a location −Y;

said locations −Y, Z and X defining with said location O, the directions of said beam, of said first said radiation component, and of said second said radiation component, respectively, said directions being orthogonal and intersecting at said location O.

7. The apparatus of claim 5, wherein,
said second means includes polarizing means for varying the plane of polarization of said beam such that sometimes said first said radiation component is directed to a predetermined location, but other times said second said radiation component is instead directed to said predetermined location;
said third means having an element at said predetermined location for picking up both said radiation components.

8. The apparatus of claim 5, wherein said beam, said first said radiation component, and said second said radiation component, are along the respective orthogonal axes Y, Z, and X, the origin of which axes is at said location O;
said second means being a polarizer operable to polarize said beam so that said electric vector is alternately along said X axis and along said Z-axis, whereby said first said radiation component alternates with said second said radiation component along one of said axes;
said third means being located on said one of said axes for alternately detecting said first said and said second said radiation components.

9. A spectroscopic method for analyzing a fluorescing sample, comprising:
the first step of providing said sample in freely-reorienting form;
the second step of providing a beam of monochromatic plane-polarized radiation;
the third step of irradiating said sample with said beam;
the fourth step of detecting radiation emitted by said sample in response to said beam and along the direction of the electric vector of said beam, and while said beam is irradiating said sample;
the fifth step of detecting radiation emitted by said sample in response to said beam and perpendicular to the direction of the said electric vector, and while said beam is irradiating said sample;
and the sixth step of comparing the intensity of such radiation as is detected in said fourth step with the intensity of such radiation as is detected in said fifth step and obtaining the difference between said intensities.

10. The spectroscopic method of claim 9 wherein, said second step includes periodically changing the orientation of said plane of polarization, in such sense and amount, that one of said detecting steps periodically detects the sample-emitted radiation normally detected by the other of said detecting steps.

11. Instrumentation for use in spectroscopy, of the type wherein a sample scatters a plane-polarized beam of monochromatic light incident thereon and wherein the practice is to detect, and to produce signals corresponding to, only such components of light as are emitted from said sample in response to said beam, and correspond to Raman scattering by said sample, are emitted from said sample in directions both perpendicular and parallel to the electric vector of said beam, and wherein there are comparing means for receiving said signals and providing a measure of the difference between the intensities of the parallel components of said light emitted from said sample, and the intensities of the perpendicular components thereof;
said instrumentation comprising, in combination, a polarizing means operable for causing said beam to be polarized such that its said electric vector can be oriented in one sense or the other corresponding to one or the other of said directions, said comparing means including a lock-in amplifier for amplifying said signals, said amplifier being adapted to amplify a signal having a given frequency; and there being means for operating said polarizing means such as to cause the said senses of orientation of said electric vector to alternate at said given frequency.

12. The instrumentation of claim 11, wherein said polarizing means is a Kerr cell.

13. The instrumentation of claim 11, wherein said polarizing means is a Pockels cell.

* * * * *

UNITED STATES PATENT OFFICE
CERTIFICATE OF CORRECTION

PO-1050 (5/69)

Patent No. 3,807,862                Dated April 30, 1974

Inventor(s)  Douglas Albert Hatzenbuhler

It is certified that error appears in the above-identified patent and that said Letters Patent are hereby corrected as shown below:

Column 1, line 38, "any" should be many.

In equations 1, 2 and 3 in columns 2 and 3, the respective fractions 7/45, 6/45, and 1/45, should be read as multiples of $\gamma^2$ (gamma squared).

Signed and sealed this 1st day of October 1974.

(SEAL)
Attest:

McCOY M. GIBSON JR.                 C. MARSHALL DANN
Attesting Officer                   Commissioner of Patents